(12) United States Patent
Egawa et al.

(10) Patent No.: US 7,791,454 B2
(45) Date of Patent: Sep. 7, 2010

(54) ENGINE STARTING SWITCH AND PORTABLE DEVICE

(75) Inventors: Tetsuya Egawa, Aichi (JP); Toru Maeda, Aichi (JP); Masaki Kawashima, Aichi (JP); Tomoyuki Funayama, Toyota (JP); Koji Iwamoto, Aichi-ken (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 129 days.

(21) Appl. No.: 10/859,334

(22) Filed: Jun. 1, 2004

(65) Prior Publication Data

US 2004/0251744 A1 Dec. 16, 2004

(30) Foreign Application Priority Data

Jun. 3, 2003 (JP) .............................. 2003-158554

(51) Int. Cl.
*H04Q 5/22* (2006.01)
*G05B 19/00* (2006.01)
*G06F 7/00* (2006.01)

(52) U.S. Cl. .................... 340/10.5; 340/426.3; 340/5.6; 340/5.65; 340/5.72; 70/360; 70/406

(58) Field of Classification Search ................ 307/10.5, 307/10.1–10.3, 10.6; 340/5.6–5.65, 426.3, 340/10.5; 200/43.04, 43.13; 70/360, 408, 70/406
See application file for complete search history.

(56) References Cited

U.S. PATENT DOCUMENTS

| | | | | |
|---|---|---|---|---|
| 4,354,189 A | * | 10/1982 | Lemelson | 340/5.61 |
| 4,453,161 A | * | 6/1984 | Lemelson | 340/5.63 |
| 5,343,077 A | * | 8/1994 | Yoshida et al. | 340/5.64 |
| 5,444,199 A | * | 8/1995 | Burchard et al. | 200/43.04 |
| 5,491,470 A | * | 2/1996 | Veligdan | 340/5.6 |
| 5,708,308 A | * | 1/1998 | Katayama et al. | 307/10.5 |
| 5,763,958 A | * | 6/1998 | Yamamoto et al. | 307/10.5 |
| 5,977,655 A | * | 11/1999 | Anzai | 307/10.3 |
| 6,043,568 A | * | 3/2000 | Matsumoto et al. | 307/10.5 |
| 6,259,168 B1 | | 7/2001 | Okada | |
| 6,525,433 B1 | * | 2/2003 | Enoyoshi et al. | 307/10.5 |
| 6,546,768 B1 | * | 4/2003 | Burghoff et al. | 70/252 |
| 6,573,615 B1 | * | 6/2003 | Asakura et al. | 307/9.1 |
| 6,617,959 B1 | * | 9/2003 | Kuo | 340/5.61 |
| 6,776,016 B1 | * | 8/2004 | Wittwer et al. | 70/252 |
| 6,803,675 B2 | * | 10/2004 | Harada et al. | 307/10.3 |

(Continued)

FOREIGN PATENT DOCUMENTS

GB 2299613 A 10/1996

(Continued)

*Primary Examiner*—Brian A Zimmerman
*Assistant Examiner*—Nam V Nguyen
(74) *Attorney, Agent, or Firm*—Crompton, Seager & Tufte LLC

(57) ABSTRACT

A switch for urging a driver to perform an operation that is required when the smart ignition function is invalid. The switch is used by a driver to start the engine of a vehicle when the vehicle communicates with a portable device to verify the portable device. The portable device has an end portion. The switch includes a push button pushed by the driver. The push button includes a guide portion engaged with the end portion of the portable device.

11 Claims, 2 Drawing Sheets

U.S. PATENT DOCUMENTS 6,810,701 B2 * 11/2004 Lee et al. .................. 70/186

FOREIGN PATENT DOCUMENTS

| | | |
|---|---|---|
| JP | 2000-79868 A | 3/2000 |
| JP | 2002-29385 A | 1/2002 |
| JP | 2002-295078 A | 10/2002 |
| JP | 2003-27793 A | 1/2003 |
| JP | 2003-511291 A | 3/2003 |
| WO | 01/25063 A1 | 4/2001 |

* cited by examiner

ENGINE STARTING SWITCH AND PORTABLE DEVICE

BACKGROUND OF THE INVENTION

The present invention relates to a switch and a portable device, and more particularly, to an engine starting switch and a portable device that are used in a smart key system for permitting an engine of an automobile to be started when the portable device is verified through communication between the portable device, which is carried by a driver, and an engine start controller, which is arranged in the automobile.

In recent years, smart key systems provided with a "smart ignition" function, which is described, for example, in Japanese Laid-Open Patent Publication No. 2002-029385, have been proposed for automobiles to improve their security level and convenience. When a portable device is carried into an automobile, a controller, which realizes the smart ignition function, permits starting of the engine when verifying that the portable device corresponds to the automobile. When the starting of the engine is permitted, a driver operates an engine starting switch to start the engine.

In more detail, a smart key system includes a portable device, which is carried by a driver, and an engine start controller, which is installed in an automobile. The portable device stores an ID code unique to the portable device (ID codes differ between portable devices). The engine start controller stores an ID code (ID code of the automobile), which is the same as that of the portable device.

In such a smart key system, the engine start controller transmits a request signal to a first area that includes substantially the entire passenger compartment of the automobile (normal control). In response to the request signal, the portable device transmits an ID code signal including an ID code. When receiving the ID code signal, the engine start controller determines whether the ID code of the portable device and the ID code of the automobile match. When the two ID codes match, that is, when portable device verification is achieved by communication between the portable device and the engine start controller in the first area based on the normal control, the smart ignition function is validated and the starting of the engine is permitted.

With the smart ignition function, the driver is not required to perform any complicated key operation to start the engine. The driver can start the engine simply by carrying the portable device into the automobile and operating the engine starting switch. In this way, the smart ignition function improves convenience. Further, the starting of the engine is not permitted unless the driver is carrying the portable device, which is far more difficult to duplicate than a conventional mechanical key. Thus, the smart ignition function improves security.

A portable device used for the smart ignition function includes a battery, which functions as a power source. When the battery of the portable device is drained, communication based on the normal control is not performed even if the driver carrying the portable device enters the first area (in the automobile). In this case, the smart ignition function is invalidated. Therefore, an "immobilizer function" is used instead of the smart ignition function when the battery of the portable device is drained. An immobilizer system provided with an immobilizer function is capable of coping with battery drainage in the portable device. With the immobilizer function, the starting of the engine is permitted when the driver performs a predetermined operation using the portable device.

In more detail, the portable device includes a transponder. The transponder stores a transponder code unique to the transponder, or unique to the portable device (transponder codes differ between portable devices). The engine start controller stores a transponder code (transponder code of the automobile), which is the same as that of the portable device.

With the immobilizer system, the engine start controller transmits a transponder drive radio wave to a second area that is much smaller than the first area in the automobile (backup control). In response to the transponder drive radio wave, the portable device transmits a transponder code signal including the transponder code. When receiving the transponder code signal, the engine start controller determines whether the transponder code of the portable device and the transponder code of the automobile match. When the two transponder codes match, that is, when portable device verification is achieved by communication between the portable device and the engine start controller in the second area based on the backup control, the immobilizer function is validated and the starting of the engine is permitted.

As described above, when the smart ignition function is valid, the driver carries the portable device into the first area (into the automobile) (normal operation). Afterward, if portable device verification is achieved in the first area based on the normal control, the starting of the engine is permitted. When the smart ignition function is invalid, the driver holds the portable device in the second area, which is much smaller than the first area. Then, if portable device verification is achieved in the second area based on the backup control, the starting of the engine is permitted. Thus, to have the starting of the engine permitted, the driver is required to hold the portable device in the second area (e.g., the driver is required to hold the portable device over an instrument panel at a position to which the drive radio wave is transmitted).

However, the driver is usually unaware that the smart ignition function is invalid and that the portable device must be held at the designated position. Thus, there has been a demand for a mechanism that would prompt the driver to perform the necessary operation when the smart ignition function is invalid.

SUMMARY OF THE INVENTION

The present invention provides a switch and a portable device that appropriately prompts a driver to perform the required operation when the smart ignition function is invalid.

One aspect of the present invention is a switch used by a driver to start an engine of a vehicle when the vehicle communicates with a portable device to verify the portable device. The portable device has an end portion, and the switch starts the engine when the portable device is verified. An operation member is operated by the driver. The operation member includes a guide portion engagable with the end portion of the portable device.

Another aspect of the present invention is a switch used by a driver to start an engine of a vehicle when the vehicle communicates with a portable device to verify the portable device. The portable device includes a tapered end portion. The switch includes a push button pushed by the driver. The push button includes a tapered groove extending along a surface of the push button and engagable with the end portion of the portable device.

A further aspect of the present invention is a portable device for communicating with a vehicle to be verified when a driver operates a switch to start an engine of the vehicle. The switch includes an operation member operated by the driver and having a guide portion with a predetermined shape. The portable device includes an end portion engagable with the guide portion of the operation member.

A further aspect of the present invention is a verification system for use when starting an engine of a vehicle. The system includes a portable device for communicating with the vehicle to obtain verification. The portable device includes an end portion. A switch includes an operation member operated by a driver when the portable device communicates with the vehicle. The operation member includes a guide portion engagable with the end portion of the portable device.

A further aspect of the present invention is a verification system for use when starting an engine of a vehicle. The system includes a portable device for communicating with the vehicle to obtain verification. The portable device includes a tapered end portion. A switch includes a push button pushed by a driver when the portable device communicates with the vehicle. The push button includes a groove engagable with the end portion of the portable device.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A portable device 2 and an engine starting switch 40 according to a preferred embodiment of the present invention will now be described.

Figure 1:
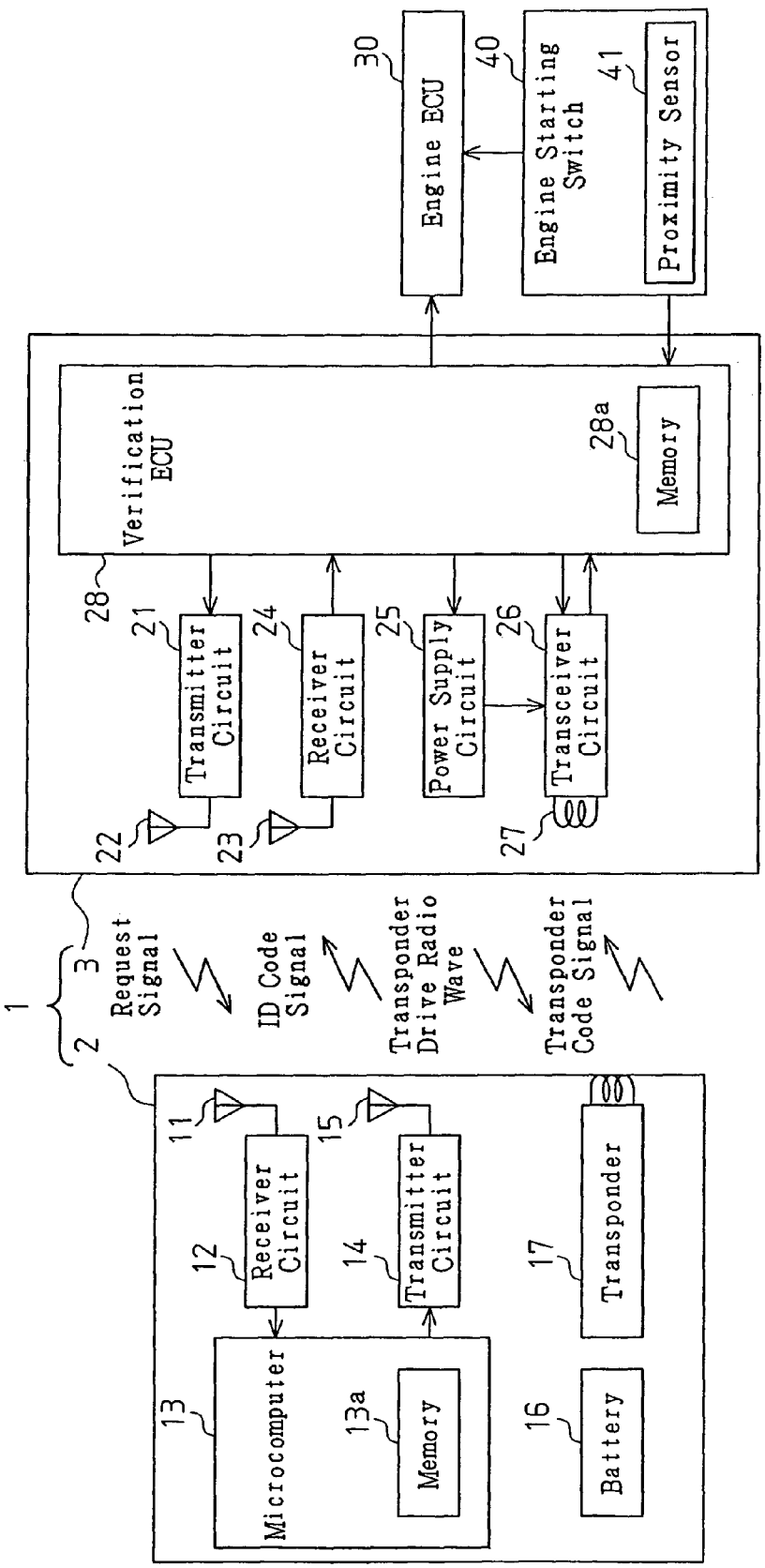
FIG. 1 is a schematic block diagram showing a smart key system using a portable device and an engine starting switch according to a preferred embodiment of the present invention.

As shown in FIG. 1, a smart key system 1 includes the portable device 2 and an engine start controller 3. The portable device 2 transmits an ID code signal including an ID code and a transponder code signal including a transponder code. The engine start controller 3 transmits a request signal and a transponder drive radio wave.

The portable device 2, which is carried by a driver (user), includes a receiver antenna 11, a receiver circuit 12, a microcomputer 13, a transmitter circuit 14, a transmitter antenna 15, a battery 16, and a transponder 17. The receiver circuit 12 receives a request signal from the engine start controller 3 via a receiver antenna 11, demodulates the request signal to generate a received signal, and provides the received signal to the microcomputer 13. The microcomputer 13 includes a CPU, a ROM, and a RAM (none shown) in addition to a memory 13a. The memory 13a stores an ID code that is unique to the portable device 2 (ID codes differ between portable devices).

When receiving the received signal from the receiver circuit 12, the microcomputer 13 provides the transmitter circuit 14 with an output signal including an ID code to respond to the request signal. The transmitter circuit 14 modulates the output signal to a radio wave having a predetermined frequency (300 MHz in the preferred embodiment) and transmits the radio wave (ID code signal) via the transmitter antenna 15. The battery 16 functions as a power source for transmitting the ID code signal including the ID code in response to the request signal. The transponder 17 stores a transponder code unique to the transponder 17, or unique to the portable device 2 (transponder codes differ between portable devices). The transponder 17 receives a transponder drive radio wave from the controller 3 to generate electromotive force. Then, the transponder 17 uses the electromotive force to transmit a signal including the transponder code as a radio wave (transponder code signal) having a predetermined frequency (134 KHz in the preferred embodiment).

Figure 2:
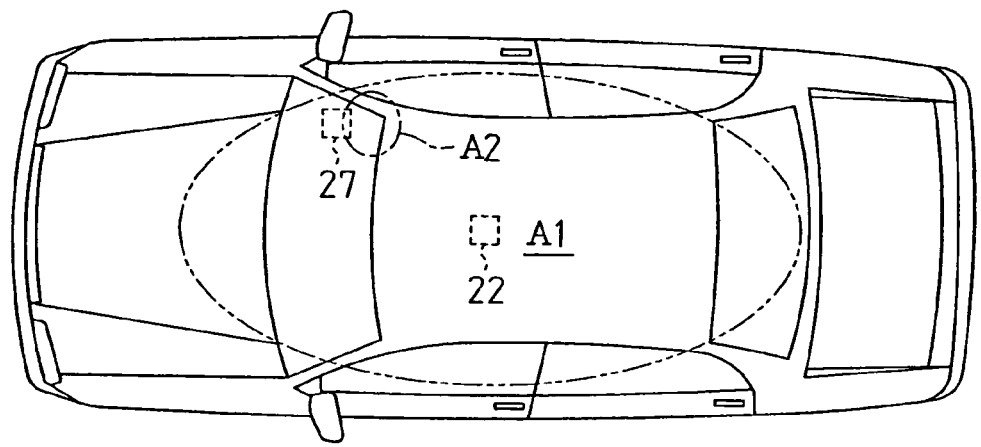
FIG. 2 is a diagram showing a first area and a second area.

The engine start controller 3, which is arranged in an automobile, includes a transmitter circuit 21, a transmitter antenna 22, a receiver antenna 23, a receiver circuit 24, a power supply circuit 25, a transceiver circuit 26, a transceiver antenna 27, and a verification ECU 28. The verification ECU 28 provides the transmitter circuit 21 with a request signal. The transmitter circuit 21 modulates the request signal received from the verification ECU 28 to a radio wave having a predetermined frequency (134 KHz in the preferred embodiment) and transmits the radio wave to a first area A1 (refer to FIG. 2) via the transmitter antenna 22. The first area A1 includes substantially the entire passenger compartment of the automobile. The receiver circuit 24 receives the ID code signal from the portable device 2 via the receiver antenna 23, demodulates the signal to generate a received signal, and provides the verification ECU 28 with the received signal.

The power supply circuit 25 supplies the transceiver circuit 26 with power. The transceiver circuit 26 uses the power supplied from the power supply circuit 25 to generate the transponder drive radio wave, which has a predetermined frequency (134 KHz in the preferred embodiment). Then, the transceiver circuit 26 transmits the transponder drive radio wave to a predetermined second area A2 (refer to FIG. 2) via the transceiver antenna 27. The second area A2 is much smaller than the first area A1. The second area A2 is preferably an area that can be reached by the driver when seated in the driver's seat, such as an area near the middle of the instrument panel. In the preferred embodiment, the second area A2 is defined in a range separated from the transceiver antenna 27 by 20 to 50 mm. The transceiver circuit 26 receives the transponder code signal from the portable device 2 via the transceiver antenna 27, demodulates the signal to generate a received signal, and provides the verification ECU 28 with the received signal.

Communication between the portable device 2 and the controller 3 is enabled in the first area A1 and the second area A2.

The verification ECU 28 includes a CPU, a ROM, and a RAM (none shown) in addition to a memory 28a. The memory 28a stores an ID code (ID code of automobile), which is the same as that of the portable device 2, and a transponder code (transponder code of automobile), which is the same as that of the portable device 2.

The verification ECU 28 transmits a request signal to the first area A1. When receiving a received signal including an ID code from the receiver circuit 24, the verification ECU 28 determines whether the ID code of the portable device 2 and the ID code of the automobile match (ID code verification). In addition, the verification ECU 28 transmits a transponder drive radio wave to the second area A2. When receiving a received signal including a transponder code from the transceiver circuit 26, the verification ECU 28 determines whether the transponder code of the portable device 2 and the transponder code of the automobile match (transponder code verification).

When the two ID codes match in the ID code verification or when the two transponder codes match in the transponder code verification, the verification ECU 28 provides the engine ECU 30 with an engine start permission signal (engine start permission control).

When an operation for starting the engine is performed, the engine starting switch 40 is shifted to an engine start position by the operation. When the engine starting switch 40 is shifted to the engine start position while the engine ECU 30 is being provided with the engine start permission signal by the verification ECU 28, the engine ECU 30 drives a starter motor (not shown) to start the engine.

The engine starting switch 40 includes a proximity sensor 41. The proximity sensor 41 detects that the engine starting switch 40 has been operated with the portable device 2. Further, the proximity sensor 41 provides the verification ECU 28 with a detection signal indicating that such an operation has been performed. In response to the detection signal provided from the proximity sensor 41, the verification ECU 28 switches from normal control, in which the request signal is transmitted to the first area A1, to backup control, in which a transponder drive radio wave is transmitted to the second area A2.

Figure 3A:
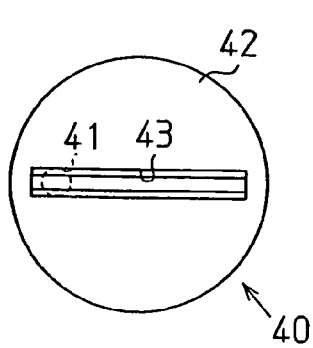
FIG. 3A is a front view of the engine starting switch of FIG. 1.
Figure 3B:
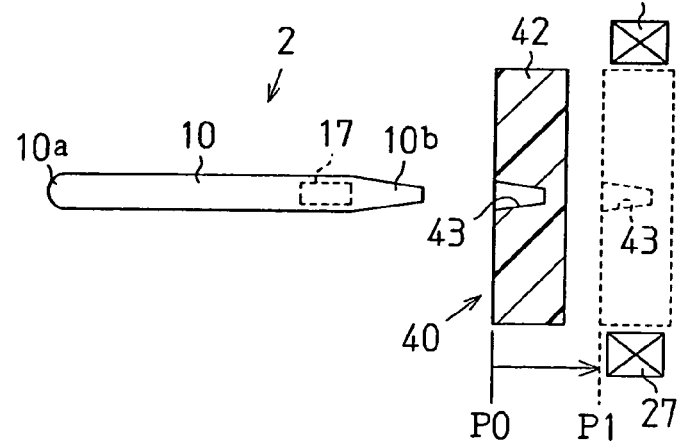
FIG. 3B is a partial cross-sectional side view of the engine starting switch and the portable device of FIG. 1.

The portable device 2 and the engine starting switch 40 of the preferred embodiment will now be described in more detail, with reference to FIGS. 3A and 3B.

The engine starting switch 40 is a push button switch including a push button (operation member) 42 that is pushed by the driver. When the push button 42 is not pushed by the driver, the push button 42 is located at a home position P0 as shown in the state of FIG. 3B. The driver pushes and moves the push button 42 from the home position P0 to an engine start position P1. The engine starting switch 40 is provided with a return function that returns the push button 42 from the engine start position P1 to the home position P0 when the driver releases the push button 42.

A guide groove 43 is formed in the middle of the push button 42. The guide groove 43 extends through the surface of the push button 42 in a horizontal direction. The portable device 2 has a portable device body 10, which includes a distal portion 10b. The guide groove 43 is shaped in correspondence with the outer shape of the distal portion 10b of the portable device body 10.

The portable device body 10, which is a rectangular plate, includes a basal portion 10a, which functions as a grip portion gripped by the driver. The distal portion 10b of the portable device body 10 functions as an engagement portion engaged with the guide groove 43 of the engine starting switch 40. The basal portion 10a and the distal portion 10b of the portable device body 10 have different outer shapes so that only the distal portion 10b can be engaged with the guide groove 43 by a concavo-convex relationship. In other words, the portable device 2 has a structure that prevents the basal portion 10a from being engaged with the guide groove 43.

To be more specific, the basal portion 10a has a generally semicircular cross-section, so that the basal portion 10a is rounded at the basal end of the portable device body 10. The distal portion 10b has a tapered cross section, so that the distal portion 10b is narrowed toward the distal end of the portable device body 10. The guide groove 43 has a tapered cross-section corresponding to the distal portion 10b. The guide groove 43 is wider at positions closer to the surface of the push button 42.

The portable device body 10 accommodates a transponder 17 near the distal portion 10b. The transponder 17 generates electromotive force when receiving a transponder drive radio wave, and transmits a transponder code with the electromotive force. The engine starting switch 40 includes the transceiver antenna 27 used to transmit a transponder drive radio wave. The engine starting switch 40 also includes the proximity sensor 41 for detecting that the distal portion 10b of the portable device 2 is engaged with the guide groove 43. As shown in FIG. 3A, the proximity sensor 41 is arranged in the push button 42 near the guide groove 43.

The operation for starting the engine will now be described.

When the driver gets in the automobile, the verification ECU 28 controls the transmitter circuit 21 to intermittently transmit a request signal to the first area A1. In other words, the verification ECU 28 executes the normal control. When receiving the request signal, the portable device 2 transmits an ID code signal including an ID code. When receiving the ID code signal, the verification ECU 28 determines whether the ID code of the portable device 2 and the ID code of the automobile match. In other words, the verification ECU 28 executes the ID code verification.

When the driver is holding a portable device 2 that corresponds to that automobile, the ID code of the portable device 2 and the ID code of the automobile match, and the verification ECU 28 provides the engine ECU 30 with an engine start permission signal. In this way, when the two ID codes match in the ID code verification, in other words, when portable device verification is achieved by communication based on the normal control, the smart ignition function is validated and the starting of the engine is permitted.

While the starting of the engine is permitted, the driver pushes the push button 42 of the engine starting switch 40. This moves the push button 42 from the home position P0 to the engine start position P1 so that the engine ECU 30 drives the starter motor (not shown) to start the engine. As described above, when the smart ignition function is valid, the driver first carries the portable device 2 into the automobile (normal operation). Afterward, the driver may start the engine just by pushing the push button 42 of the engine starting switch 40.

When the battery of the portable device 2 is drained, communication based on the normal control is not performed even if the driver is carrying the portable device 2 when entering the first area A1. Thus, the smart ignition function is invalidated. In this case, the engine is not started even if the driver pushes the push button 42 of the engine starting switch 40 to the engine start position P1 as described above. Therefore, the driver performs an operation that is required to start the engine when the smart ignition function is invalid. To be more specific, the driver engages the distal portion 10b of the portable device 2 with the guide groove 43 of the engine starting switch 40. In this state, the driver pushes the push button 42 with the portable device 2 to shift the engine starting switch 40 from the home position P0 to the engine start position P1.

When this operation is performed, the proximity sensor 41 detects that the distal portion 10b of the portable device 2 is engaged with the guide groove 43. Then, the verification ECU 28 controls the power supply circuit 25 and the transceiver circuit 26 so that the transceiver circuit 26 transmits a transponder drive radio wave to the second area A2. In other words, the verification ECU 28 executes the backup control. When receiving the transponder drive radio wave, the portable device 2 transmits a transponder code signal including a transponder code. When receiving the transponder code signal, the verification ECU 28 determines whether the transponder code of the portable device 2 and the transponder code of the automobile match. In other words, the verification ECU 28 executes the transponder code verification.

When the driver operates the engine starting switch 40 with the portable device 2 that corresponds to the automobile, the transponder code of the portable device 2 and the transponder code of the automobile match. Thus, the verification ECU 28 provides the engine ECU 30 with an engine start permission signal. When the two transponder codes match in the transponder code verification and portable device verification is achieved based on the backup control, the starting of the engine is permitted.

The driver pushes the push button 42 with the portable device 2 to shift the engine starting switch 40 to the engine start position P1. As a result, the engine ECU 30 drives the starter motor (not shown) to start the engine. In other words, when the smart ignition function is invalid, the driver first engages the distal portion 10b of the portable device 2 with the guide groove 43 of the engine starting switch 40. In this state, the driver starts the engine just by pushing the push button 42 with the portable device 2.

The portable device 2 and the engine starting switch 40 of the preferred embodiment have the advantages described below.

(1) To enable the starting of the engine when the smart ignition function is invalid, the driver is required to hold the portable device 2 in the second area A2 and achieve portable device verification in the second area A2 based on the backup control. The push button 42 of the engine starting switch 40 has the guide groove 43 corresponding to the outer shape of the distal portion 10b of the portable device 2. Thus, the engine starting switch 40 urges the driver to engage the distal portion 10b of the portable device 2 with the guide groove 43 and push the push button 42 with the portable device 2. This structure enables the driver to recognize, at a glance, that the push button 42 should be pushed with the portable device 2 when the smart ignition function is invalid. In this way, the engine starting switch 40 ensures that the driver performs the required operation.

(2) The engine starting switch 40 includes the transceiver antenna 27 used to transmit a drive radio wave to the portable device 2. This enables communication between the portable device 2 and the controller 3 in the second area A2, which is near the engine starting switch 40, based on the backup control. Thus, even when the smart ignition function is invalid, the starting of the engine is permitted.

(3) The engine starting switch 40 includes the proximity sensor 41 for detecting that the distal portion 10b of the portable device 2 is engaged with the guide groove 43. To be more specific, the proximity sensor 41 detects that the operation for starting the engine based on the immobilizer function has been performed when the smart ignition function is invalid. In response to the detection of the above operation by the proximity sensor 41, the verification ECU 28 switches from the normal control to the backup control. In a conventional automobile, a verification ECU switches from normal control to backup control when an immobilizer key having a transponder is inserted into a key cylinder. However, in the preferred embodiment, such a key cylinder does not need to be used. This leads to such advantages as low cost, small size, lightweight, and effective use of the space in the passenger compartment.

(4) When the driver grips the basal portion 10a of the portable device 2 and properly engages the distal portion 10b of the portable device 2 with the guide groove 43, the transponder 17 is positioned near the transceiver antenna 27. When the transponder 17 and the transceiver antenna 27 are properly positioned in this way, the transponder 17 transmits a transponder code based on a transponder drive radio wave transmitted from the transceiver antenna 27. In this way, communication is performed in the second area A2 based on the backup control in a satisfactory manner to permit the starting of the engine.

If the driver mistakenly grips the distal portion 10b of the portable device 2 and improperly engages the basal portion 10a of the portable device 2 with the guide groove 43, the transponder 17 is positioned farther from the transceiver antenna 27 than when the above proper operation is performed. In this case, the transponder 17 fails to receive a sufficient transponder drive radio wave from the transceiver antenna 27 and thus does not transmit a transponder code. To be more specific, the communication is not performed in the second area A2 based on the backup control. Thus, the starting of the engine is not permitted.

To prevent such operation, the engine starting switch 40 has a structure for prompting the driver to perform the proper operation. To be more specific, the portable device 2 engaged with the engine starting switch 40 has the basal portion 10a of which outer shape differs from the outer shape of the distal portion 10b. This structure enables the driver to be aware, at a glance, of how to perform the proper operation described above to start the engine when the smart ignition function is invalid. In this way, the engine starting switch 40 ensures that the driver performs the required operation.

(5) The transponder 17 is accommodated near the distal portion 10b of the portable device body 10. With the structure according to the preferred embodiment, the distance between the transponder 17 and the transceiver antenna 27 when the above proper operation is performed is shorter than that with the structure in which the transponder 17 is accommodated in a middle portion of the portable device body 10. Thus, the communication is enabled even when the output of a transponder drive radio wave transmitted from the transceiver antenna 27 is relatively weak.

(6) The operation of pushing the push button 42 with the portable device 2 involves both the operation of holding the portable device 2 in the second area A2 and the operation of starting the engine when starting is permitted. This means that the driver can start the engine just by pushing the push button 42 with the portable device 2. Thus, even when the smart ignition function is invalid, the operability for starting the engine is improved.

It should be apparent to those skilled in the art that the present invention may be embodied in many other specific forms without departing from the spirit or scope of the invention. Particularly, it should be understood that the present invention may be embodied in the following forms.

In the preferred embodiment, the push button 42 of the engine starting switch 40 has the guide groove 43, and the portable device body 10 of the portable device 2 has the distal portion 10b, which serves as a convexity. However, the engine starting switch and the portable device may have a concavo-convex relationship opposite to that of the preferred embodiment. To be more specific, the push button 42 may include a convexity and the distal portion 10b of the portable device 2 may include a concavity that can be engaged with the convexity of the push button 42. Alternatively, the push button 42 may have a concavity and a convexity, and the distal portion 10b of the portable device 2 may have a concavity and a convexity that are engaged with the concavity and the convexity of the push button 42.

In the preferred embodiment, the proximity sensor 41 is employed as a detection unit. Instead of the proximity sensor 41, a non-contact type detection unit, such as a photoelectric sensor, or a contact type detection unit, such as a limit switch, may be employed.

The present examples and embodiments are to be considered as illustrative and not restrictive, and the invention is not to be limited to the details given herein, but may be modified within the scope and equivalence of the appended claims.

What is claimed is:

1. An engine starting switch used by a driver to start an engine of a vehicle having a smart ignition function such that the driver is not required to perform any key operation, where the vehicle communicates with a portable device to verify the portable device is within a predetermined area, and where the portable device is provided with power from the vehicle when the smart ignition function is not valid, the portable device including a portable device body having a first end portion and a second end portion shaped differently from the first end portion, the portable device further accommodating a transponder in the vicinity of the first end portion, the switch comprising:

an antenna for transmitting a drive radio wave that causes the transponder of the portable device to generate power for establishing communication between the vehicle and the portable device; and a push button operated by the driver, the push button including a concave or convex guide portion engagable with only the first end portion of the portable device body so that the second end portion is not engaged with the guide portion, the guide portion having one or more surfaces, the one or more surfaces being all the surfaces of the guide portion;

wherein when the smart ignition function is not valid, the push button is pushed by the driver by engaging the guide portion with the first end portion of the portable device body to shift the engine starting switch to an engine start position and enable the transponder to receive the drive radio wave to generate power and establish the communication between the vehicle and the transponder, thereby starting the engine, wherein when the push button is pushed by the driver by engaging the guide portion with the first end of the portable device, none of the one or more surfaces of the guide portion are moved relative to one another.

2. The engine starting switch according to claim 1, further comprising:

a detection unit for detecting that the first end portion of the portable device body is engaged with the guide portion, wherein the antenna transmits the drive radio wave when the detection unit detects that the first end portion of the portable device body is engaged with the guide portion.

3. The engine starting switch of claim 1 wherein when the push button is pushed by the driver by engaging the guide portion with the first end of the portable device, the portable device first end is in contact with only the one or more surfaces of the guide portion.

4. The engine starting switch of claim 1, wherein the push button has an exposed front surface and wherein the guide portion has a depth extending into the push button from the front surface, a width extending along the front surface of the push button, the width being greater than the depth, and a thickness, the thickness being perpendicular to both the width and the depth and wherein the thickness is less than the width and greater than the depth.

5. The engine starting switch of claim 4 wherein one of the one or more surface of the guide portion is a bottom surface spaced apart from the front surface of button by the depth and wherein the bottom surface has a width equal to the width of the guide portion.

6. An engine starting switch used by a driver to start an engine of a vehicle having a smart ignition function such that the driver is not required to perform any key operation, where the vehicle communicates with a portable device to verify the portable device within a predetermined area, and where the portable device is provided with power from the vehicle when the smart ignition function is not valid, and the portable device includes a portable device body having a tapered end portion and a rounded end portion, the portable device further accommodating a transponder in the vicinity of the tapered end portion, the switch comprising:

a push button pushed by the driver, the push button including a tapered groove extending along a surface of the push button and engagable with only the tapered end portion of the portable device body so that the rounded end portion is not engaged with the tapered groove; and an antenna for generating power to establish communication between the portable device and the vehicle when the tapered end portion of the portable device body is engaged with the groove, wherein when the smart ignition function is not valid, the push button is pushed by the driver by engaging the tapered groove with the tapered end portion of the portable device body to shift the engine starting switch to an engine start position and establish the communication between the vehicle and the transponder, thereby starting the engine, wherein the push button has an exposed front surface and wherein the guide portion has a depth extending into the push button from the front surface, a width extending along the front surface of the push button, the width being greater than the depth, and a thickness, the thickness being perpendicular to both the width and the depth and wherein the thickness is less than the width and greater than the depth.

7. The engine starting switch of claim 6, the guide portion having five planar surfaces, the five planar surfaces being all the surfaces of the guide portion.

8. A portable device for communicating with a vehicle having a smart ignition function such that the driver is not required to perform any key operation, where the vehicle communicates with the portable device to verify the portable device within a predetermined area, and where the portable device is provided with power from the vehicle, where a driver operates an engine starting switch to start an engine of the vehicle, the switch including a push button operated by the driver and having a concave or convex guide portion with a predetermined shape, the vehicle transmitting a drive radio wave for generating power to establish communication between the vehicle and the portable device, the portable device comprising:

a portable device body including a first end portion engagable with only the guide portion of the push button; and a second end portion shaped differently from the first end portion and not engagable with the guide portion of the push button, the guide portion having one or more surfaces, the one or more surfaces being all the surfaces of the guide portion; and a transponder for receiving the drive radio wave to generate power and using the power to communicate with the vehicle, the transponder being arranged in the vicinity of the first end portion of the portable device body, wherein when the smart ignition function is not valid, the push button is pushed by the driver by engaging the guide portion with the first end portion of the portable device body to shift the engine starting switch to an engine start position and enable the transponder to receive the drive radio wave to generate power and establish the communication between the vehicle and the transponder, thereby starting the engine, wherein when the push button is pushed by the driver by engaging the guide portion with the first end of the portable device, none of the one or more surfaces of the guide portion are moved relative to one another.

9. A verification system for use when starting an engine of a vehicle having a smart ignition function such that a driver is not required to perform any key operation, the system comprising:
a portable device for communicating with the vehicle within a predetermined area to obtain verification, where the portable device is provided with power from the vehicle when the smart ignition function is not valid, the portable device including a portable device body having a first end portion and a second end portion shaped differently from the first end portion, the portable device further accommodating a transponder in the vicinity of the first end portion; and
an engine starting switch including a push button operated by a driver when the portable device communicates with the vehicle, wherein the push button includes a concave or convex guide portion engagable with only the first end portion of the portable device body so that the second end portion is not engaged with the guide portion;
wherein the switch includes an antenna used to transmit a drive radio wave for generating power, and the portable device includes a transponder for receiving the drive radio wave to generate power and using the power to communicate with the vehicle, the transponder being arranged in the vicinity of the first end portion of the portable device body, and
wherein when the smart ignition function is not valid, the push button is pushed by the driver by engaging the guide portion with the first end portion of the portable device body to shift the engine starting switch to an engine start position and enable the transponder to receive the drive radio wave to generate power and establish the communication between the vehicle and the transponder, thereby starting the engine,
wherein the push button has an exposed front surface and wherein the guide portion has a depth extending into the push button from the front surface, a width extending along the front surface of the push button, the width being greater than the depth, and a thickness, the thickness being perpendicular to both the width and the depth and wherein the thickness is less than the width and greater than the depth.

10. The verification system according to claim 9, wherein the switch includes a detection unit for detecting that the first end portion of the portable device body is engaged with the guide portion, and the antenna functions when the detection unit detects that the first end portion of the portable device body is engaged with the guide portion.

11. An verification system for use when starting an engine of a vehicle having a smart ignition function such that a driver is not required to perform any key operation, the system comprising:
a portable device for communicating with the vehicle to obtain verification within a predetermined area, the portable device receiving power from the vehicle when the smart ignition function is not valid, the portable device including a portable device body having a tapered end portion and a rounded end portion, the portable device further accommodating a transponder in the vicinity of the tapered end portion; and
an engine starting switch including a push button pushed by a driver when the portable device communicates with the vehicle, wherein the push button includes a tapered groove engagable with only the end portion of the portable device body so that the rounded end portion does not fit in the tapered groove, the tapered groove having one or more surfaces, the one or more surfaces being all the surfaces of the tapered groove;
wherein the switch includes an antenna used to transmit a drive radio wave for generating power when the tapered end portion of the portable device body is engaged with the groove, and the portable device includes a transponder for receiving the drive radio wave to generate power and using the power to communicate with the vehicle, the transponder being arranged in the vicinity of the tapered end portion of the portable device body, and
wherein when the smart ignition function is not valid, the push button is pushed by the driver by engaging the tapered groove with the tapered end portion of the portable device body to shift the engine starting switch to an engine start position and enable the transponder to receive the drive radio wave to generate power and establish the communication between the vehicle and the transponder, thereby starting the engine,
wherein when the push button is pushed by the driver by engaging the guide portion with the first end of the portable device, none of the one or more surfaces of the guide portion are moved relative to one another.

* * * * *